US009501179B2

(12) United States Patent
Yilmaz et al.

(10) Patent No.: US 9,501,179 B2
(45) Date of Patent: Nov. 22, 2016

(54) TOUCH SENSOR FOR CURVED OR FLEXIBLE SURFACES

(75) Inventors: Esat Yilmaz, Santa Cruz, CA (US); Jalil Shaikh, Fremont, CA (US); David Brent Guard, Southampton (GB)

(73) Assignee: Atmel Corporation, San Jose, CA (US)

( * ) Notice: Subject to any disclaimer, the term of this patent is extended or adjusted under 35 U.S.C. 154(b) by 283 days.

(21) Appl. No.: 13/198,579

(22) Filed: Aug. 4, 2011

(65) Prior Publication Data

US 2013/0032414 A1 Feb. 7, 2013

(51) Int. Cl.
*G06F 3/044* (2006.01)
*G06F 1/16* (2006.01)

(52) U.S. Cl.
CPC .............. *G06F 3/044* (2013.01); *G06F 1/169* (2013.01); *G06F 2203/04101* (2013.01); *G06F 2203/04102* (2013.01)

(58) Field of Classification Search
CPC .................. G06F 1/169; G06F 3/044; G05F 2203/04101
See application file for complete search history.

(56) References Cited

U.S. PATENT DOCUMENTS

| | | | | |
|---|---|---|---|---|
| 5,729,249 A * | 3/1998 | Yasutake | | 345/173 |
| 6,297,811 B1 * | 10/2001 | Kent et al. | | 345/173 |
| 7,663,607 B2 * | 2/2010 | Hotelling et al. | | 345/173 |
| 7,787,917 B2 * | 8/2010 | Aoki et al. | | 455/575.3 |
| 7,864,503 B2 | 1/2011 | Chang | | |
| 7,875,814 B2 | 1/2011 | Chen | | |
| 7,884,808 B2 * | 2/2011 | Joo | | H04M 1/0202 345/169 |
| 7,920,129 B2 * | 4/2011 | Hotelling et al. | | 345/173 |
| 8,031,094 B2 | 10/2011 | Hotelling | | |
| 8,031,174 B2 | 10/2011 | Hamblin | | |
| 8,040,326 B2 | 10/2011 | Hotelling | | |
| 8,049,732 B2 | 11/2011 | Hotelling | | |
| 8,179,381 B2 * | 5/2012 | Frey et al. | | 345/174 |
| 8,217,902 B2 | 7/2012 | Chang | | |
| 8,516,728 B2 * | 8/2013 | Jung | | G09F 9/301 160/133 |
| 8,564,314 B2 * | 10/2013 | Shaikh et al. | | 324/686 |
| 8,600,083 B2 * | 12/2013 | Chiang et al. | | 381/191 |
| 8,723,824 B2 | 5/2014 | Myers | | |
| 8,970,513 B2 * | 3/2015 | Kwon et al. | | 345/173 |

(Continued)

FOREIGN PATENT DOCUMENTS

| | | |
|---|---|---|
| CN | 101672660 A | 3/2010 |
| WO | WO 2012/129247 | 9/2012 |

OTHER PUBLICATIONS

U.S. Appl. No. 13/206,689, filed Aug. 10, 2011, Yilmaz.

(Continued)

*Primary Examiner* — Kumar Patel
*Assistant Examiner* — Sejoon Ahn
(74) *Attorney, Agent, or Firm* — Baker Botts L.L.P.

(57) ABSTRACT

In one embodiment, an apparatus includes a substantially flexible substrate configured to bend at an edge between a first surface and a second surface of a device. The edge has an angle of deviation between the first and second surfaces of at least approximately 45°. The apparatus includes a touch sensor disposed on the substantially flexible substrate and configured to bend with the substantially flexible substrate at the edge between the first and second surfaces. The touch sensor includes drive or sense electrodes made of flexible conductive material configured to bend with the substantially flexible substrate at the edge between the first and second surfaces. The touch sensor has at least one active area on each of the first and second surfaces.

26 Claims, 2 Drawing Sheets

(56) References Cited

U.S. PATENT DOCUMENTS

| | | | |
|---|---|---|---|
| 9,213,453 B2* | 12/2015 | Izumi | G06F 3/044 |
| 2004/0008191 A1* | 1/2004 | Poupyrev et al. | 345/184 |
| 2004/0104900 A1* | 6/2004 | Bang | G06F 3/0412 |
| | | | 345/173 |
| 2008/0013144 A1* | 1/2008 | Chui et al. | 359/224 |
| 2008/0042976 A1* | 2/2008 | Trent et al. | 345/157 |
| 2008/0042997 A1* | 2/2008 | Endo | G06F 3/045 |
| | | | 345/176 |
| 2008/0165139 A1* | 7/2008 | Hotelling et al. | 345/173 |
| 2008/0180399 A1* | 7/2008 | Cheng | 345/173 |
| 2008/0238882 A1* | 10/2008 | Sivarajan et al. | 345/174 |
| 2008/0303782 A1* | 12/2008 | Grant et al. | 345/156 |
| 2008/0309635 A1 | 12/2008 | Matsuo | |
| 2009/0002338 A1* | 1/2009 | Kinoshita et al. | 345/174 |
| 2009/0128515 A1* | 5/2009 | Bytheway | G06F 3/044 |
| | | | 345/174 |
| 2009/0256821 A1* | 10/2009 | Mamba | G06F 3/044 |
| | | | 345/174 |
| 2009/0273577 A1* | 11/2009 | Chen | G06F 3/044 |
| | | | 345/174 |
| 2009/0315854 A1 | 12/2009 | Matsuo | |
| 2010/0026664 A1* | 2/2010 | Geaghan | 345/174 |
| 2010/0044122 A1* | 2/2010 | Sleeman et al. | 178/18.06 |
| 2010/0156811 A1* | 6/2010 | Long et al. | 345/173 |
| 2010/0169836 A1* | 7/2010 | Stallings et al. | 715/848 |
| 2010/0171708 A1* | 7/2010 | Chuang | G06F 3/041 |
| | | | 345/173 |
| 2010/0259503 A1* | 10/2010 | Yanase | G06F 3/044 |
| | | | 345/174 |
| 2010/0317409 A1* | 12/2010 | Jiang | G06F 1/1626 |
| | | | 455/566 |
| 2011/0001719 A1* | 1/2011 | Katakami | 345/173 |
| 2011/0012828 A1* | 1/2011 | Nagai et al. | 345/156 |
| 2011/0031041 A1* | 2/2011 | Bulea | G06F 3/044 |
| | | | 178/18.06 |
| 2011/0095974 A1* | 4/2011 | Moriwaki | 345/156 |
| 2011/0175834 A1* | 7/2011 | Han et al. | 345/173 |
| 2011/0193829 A1* | 8/2011 | Tsai et al. | 345/204 |
| 2011/0253668 A1* | 10/2011 | Winoto et al. | 216/13 |
| 2011/0273394 A1* | 11/2011 | Young | G06F 3/047 |
| | | | 345/174 |
| 2011/0291923 A1* | 12/2011 | Tong | 345/156 |
| 2012/0019478 A1* | 1/2012 | Bulea | 345/174 |
| 2012/0032916 A1* | 2/2012 | Enoki | 345/174 |
| 2012/0038613 A1* | 2/2012 | Choi | 345/211 |
| 2012/0061625 A1* | 3/2012 | Eckert | 252/514 |
| 2012/0062447 A1* | 3/2012 | Tseng | G02F 1/136286 |
| | | | 345/33 |
| 2012/0086651 A1* | 4/2012 | Kwon et al. | 345/173 |
| 2012/0127097 A1* | 5/2012 | Gaynor et al. | 345/173 |
| 2012/0242588 A1 | 9/2012 | Myers | |
| 2012/0242592 A1* | 9/2012 | Rothkopf et al. | 345/173 |
| 2012/0243151 A1 | 9/2012 | Lynch | |
| 2012/0243719 A1 | 9/2012 | Franklin | |
| 2012/0261242 A1* | 10/2012 | Guard et al. | 200/600 |
| 2012/0326853 A1* | 12/2012 | Reponen | G06F 1/1626 |
| | | | 340/407.1 |
| 2013/0002572 A1* | 1/2013 | Jin | G02F 1/133305 |
| | | | 345/173 |
| 2013/0002583 A1* | 1/2013 | Jin | G06F 1/1637 |
| | | | 345/173 |
| 2013/0009892 A1* | 1/2013 | Salmela | G06F 3/016 |
| | | | 345/173 |
| 2013/0038378 A1* | 2/2013 | Singh et al. | 327/517 |
| 2013/0038563 A1 | 2/2013 | Yilmaz | |
| 2013/0063891 A1* | 3/2013 | Martisauskas | G06F 1/1643 |
| | | | 361/679.56 |
| 2013/0076612 A1 | 3/2013 | Myers | |
| 2013/0129958 A1* | 5/2013 | Li | G02B 27/00 |
| | | | 428/41.7 |
| 2013/0169520 A1* | 7/2013 | Cho | G06F 3/0488 |
| | | | 345/156 |
| 2013/0215035 A1* | 8/2013 | Guard | 345/168 |
| 2014/0152579 A1* | 6/2014 | Frey | 345/173 |
| 2014/0176490 A1* | 6/2014 | Zhou | G06F 3/0412 |
| | | | 345/174 |
| 2014/0313169 A1* | 10/2014 | Kravets | G06F 3/044 |
| | | | 345/178 |
| 2014/0362030 A1* | 12/2014 | Mo | G06F 3/044 |
| | | | 345/174 |

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.
Chinese Office Action and Search Report (English Translation of Search Report attached) issued for Application No. 201210231833.X ,10 pages, Apr. 8, 2016.

* cited by examiner

TOUCH SENSOR FOR CURVED OR FLEXIBLE SURFACES

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive display application, the touch sensor may enable a user to interact directly with what is displayed on the screen, rather than indirectly with a mouse or touchpad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are different types of touch sensors, such as (for example) resistive touch screens, surface acoustic wave touch screens, and capacitive touch screens. Herein, reference to a touch sensor may encompass a touch screen, and vice versa, where appropriate. A capacitive touch screen may include an insulator coated with a substantially transparent conductor in a particular pattern. When an object touches or comes within proximity of the surface of the capacitive touch screen, a change in capacitance may occur within the touch screen at the location of the touch or proximity. A controller may process the change in capacitance to determine its position on the touch screen.

DESCRIPTION OF EXAMPLE EMBODIMENTS

Figure 1:
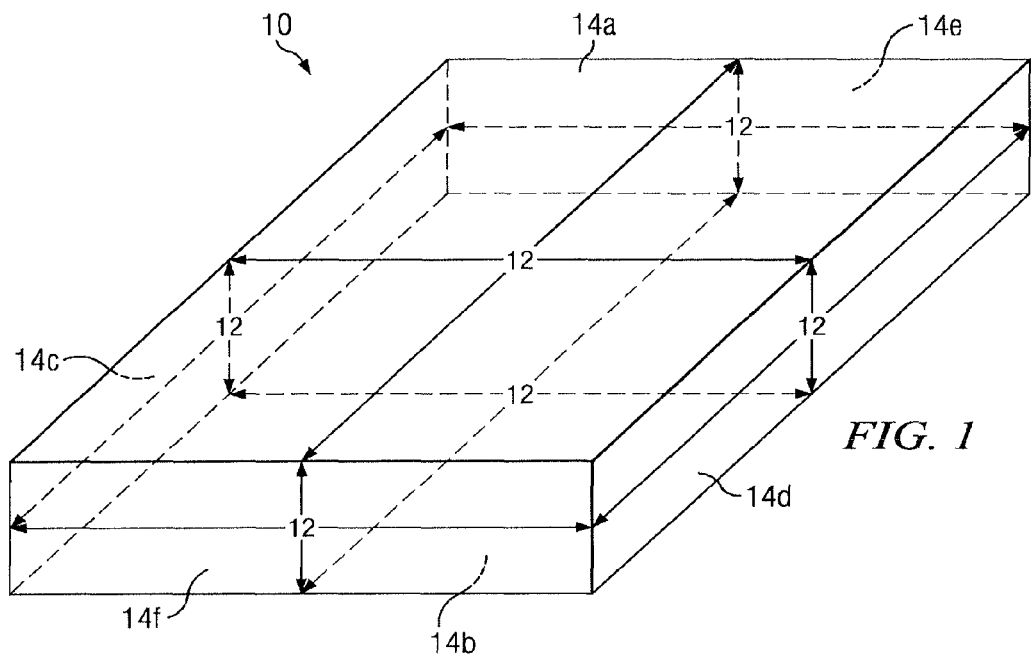
FIG. 1 illustrates an example device with multiple touch-sensitive areas on multiple surfaces.

FIG. 1 illustrates an example device 10 with touch-sensitive areas 12 on multiple surfaces 14. Device 10 may be a smartphone, a PDA, a tablet computer, a laptop computer, a desktop computer, a kiosk computer, a satellite navigation device, a portable media player, a portable game console, a point-of-sale device, another suitable device 10, a suitable combination of two or more of these, or a suitable portion of one or more of these. Device 10 may have six surfaces 14: (1) front surface 14a; (2) back surface 14b; (3) left-side surface 14c; (4) right-side surface 14d; (5) top surface 14e; and (6) bottom surface 14f. Although this disclosure describes and illustrates a particular device with a particular number of particular surfaces with particular shapes and sizes, this disclosure contemplates any suitable device with any suitable number of any suitable surfaces with any suitable shapes (including but not limited to being planar in whole or in part, curved in whole or in part, flexible in whole or in part, or a suitable combination of these) and any suitable sizes.

Device 10 may have touch-sensitive areas 12 on all six of its surfaces 14: (1) one on front surface 14a; (2) one on back surface 14b; (3) one on left-side surface 14c; (4) one on right-side surface 14d; (5) one on top surface 14e; and (6) one on bottom surface 14f. Each touch-sensitive area 12 may detect the presence and location of a touch or proximity of an object (for example, a user's finger or a stylus) on touch-sensitive area 12. One or more of touch-sensitive areas 12 may each extend out to one or more of the edges of its surface 14. In the example of FIG. 1, touch-sensitive area 12 on front surface 14a extends substantially out to all four edges of front surface 14a; touch-sensitive area 12 on back surface 14b extends substantially out to all four edges of back surface 14b; touch-sensitive area 12 on left-side surface 14c extends substantially out to all four edges of left-side surface 14c; touch-sensitive area 12 on right-side surface 14d extends substantially out to all four edges of right-side surface 14d; touch-sensitive area 12 on top surface 14e extends substantially out to all four edges of top surface 14e; and touch-sensitive area 12 on bottom surface 14f extends substantially out to all four edges of bottom surface 14f. As an alternative, one or more touch-sensitive areas 12 may cover less than the entire area of their respective surfaces 14. As an example, touch-sensitive area 12f may be a small button on surface 14f, covering only a small portion of the entire area of surface 14f. In the example of FIG. 1, one or more surfaces 14 with one or more touch-sensitive areas 12 may include room along one or more of its edges for tracking, as described below. Although this disclosure describes and illustrates a particular number of touch-sensitive areas with particular shapes and sizes on a particular number of particular surfaces of a particular device, this disclosure contemplates any suitable number of touch-sensitive areas with any suitable shapes and sizes on any suitable number of any suitable surfaces of any suitable device.

As described above, a touch-sensitive area 12 may include a touch sensor that may detect the presence and location of a touch or proximity of an object on touch-sensitive area 12. The touch sensor may implement a capacitive form of touch sensing. As an example and not by way of limitation, the touch sensor may include an array of drive electrodes and sense electrodes forming capacitive nodes. A change in capacitance at a capacitive node of a touch sensor in a touch-sensitive area 12 may indicate a touch or proximity of an object at the position of the node in touch-sensitive area 12. In a single-layer configuration, the drive and sense electrodes may be disposed in a pattern on one side of a substrate. In such a configuration, a pair of drive and sense electrodes capacitively coupled to each other across a gap between them may form a capacitive node. As an alternative, in a two-layer configuration, the drive electrodes may be disposed in a pattern on one side of a substrate and the sense electrodes may be disposed in a pattern on another side of the substrate. In such a configuration, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across the substrate at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

The drive and sense electrodes of a touch sensor may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and have a thickness of approximately 5 μm or less and a width of approximately 10 μm or less. Although this disclosure describes particular conductive material for particular electrodes of particular touch sensors, this disclosure contemplates any suitable conductive material for any suitable electrodes of any suitable touch sensors. Moreover, this disclosure contemplates the conductive material having any suitable thickness or width. As described above, drive and sense electrodes may be disposed on a substrate (or on multiple substrates), which may be a dielectric material. One or more portions of the substrate may be made of polyethylene terephthalate (PET) or another suitable material. This disclosure contemplates any suitable number of substrates with any suitable portions made of any suitable material.

A mechanical stack may contain the substrate (or multiple substrates) and the conductive material forming the drive and sense electrodes. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive and sense electrodes. The mechanical stack may also include a second layer of OCA and a dielectric layer (which may be made of PET or another suitable material). The second layer of OCA may be disposed between the substrate with the conductive material making up the drive and sense electrodes and the dielectric layer, and the dielectric layer may be disposed between the second layer of OCA and an airgap to a display of device 10. The cover panel may have a thickness of approximately 1 mm; the first layer of OCA may have a thickness of approximately 0.05 mm; the substrate with the conductive material forming the drive and sense electrodes may have a thickness of approximately 0.05 mm (including the conductive material forming the drive and sense electrodes); the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses.

Figure 2A:
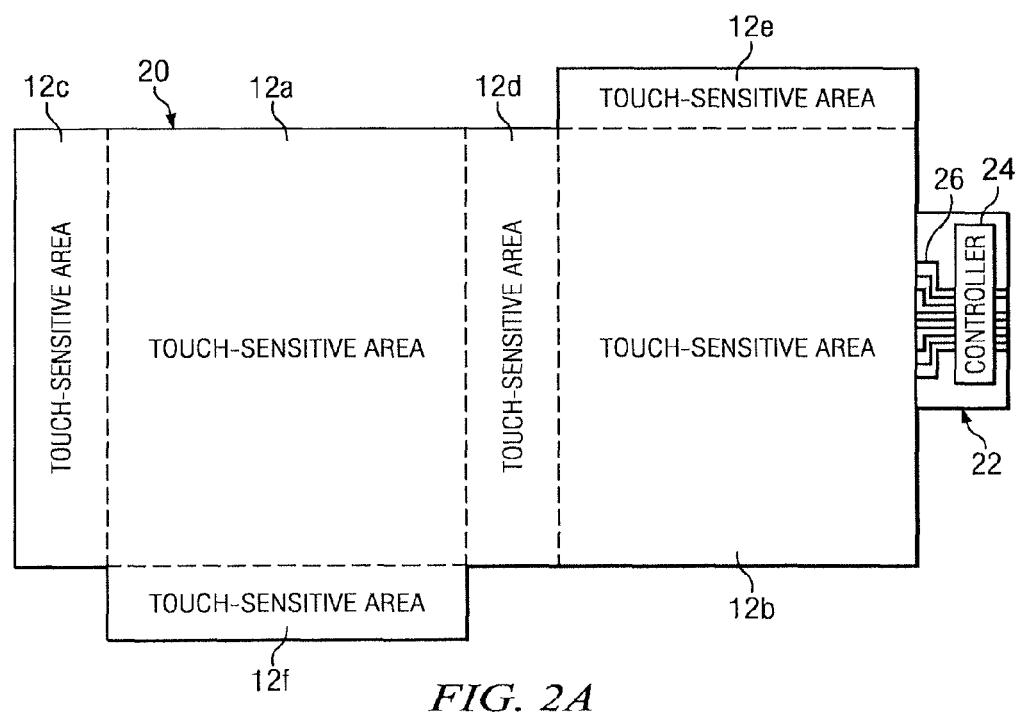
FIG. 2A illustrates an example substrate for the example device of FIG. 1 with multiple touch-sensitive areas bonded to a single flexible printed circuit (FPC) with a single controller.

FIG. 2A illustrates an example substrate 20 for device 10 with multiple touch-sensitive areas 12 bonded to a single FPC 22 with a single controller 24. In the example of FIG. 2A, there are six touch-sensitive areas 12 on substrate 20: (1) touch-sensitive area 12a for front surface 14a of device 10; (2) touch-sensitive area 12b for back surface 14b of device 10; (3) touch-sensitive area 12c for left-side surface 14c of device 10; (4) touch-sensitive area 12d for right-side surface 14d of device 10; (5) touch-sensitive area 12e for top surface 14e of device 10; and (6) touch-sensitive area 12f for bottom surface 14f of device 10. On or more portions of substrate 20 may be made of PET or another suitable material. Drive and sense electrodes made of fine lines of metal or other conductive material may be disposed on substrate 20. Substrate 20 and the conductive material of the drive and sense electrodes may be flexible, enabling them to wrap around an edge from one touch-sensitive area 12 to another. As an example and not by way of limitation, substrate 20, the conductive material of the drive and sense electrodes, and the tracking may wrap around the edge between touch-sensitive area 12a on front surface 14a of device 10 and touch-sensitive area 12d on right-side surface 14d of device 10. This ability to wrap around an edge may enable one substrate 20 with one set of drive and sense electrodes to provide a touch sensor for multiple touch-sensitive areas 12 on multiple surfaces 14 of a device 10. In particular embodiments, one or more touch-sensitive areas 12 on one or more surfaces 14 may be one or more discrete keys. Substrate 20 and the set of drive and sense electrodes disposed on it may be substantially continuous across the one or more edges they wrap around and the two or more touch-sensitive areas 12 they provide. In the example of FIG. 2A, one substantially continuous substrate 20 with one substantially continuous set of drive and sense electrodes provides a touch sensor for six different touch-sensitive areas 12 on six different surfaces 14 of device 10.

Although this disclosure describes and illustrates the example of FIG. 2A with one substantially continuous set of drive and sense electrodes, this disclosure also contemplates one substantially continuous substrate 20 with multiple distinct sets of drive and sense electrodes that are not continuous with respect to each other on substrate 20. This disclosure contemplates any suitable number of any suitable sets of any suitable drive and sense electrodes of any suitable types arranged in any suitable configurations on any suitable continuous portions of any suitable substrate.

Figure 2B:
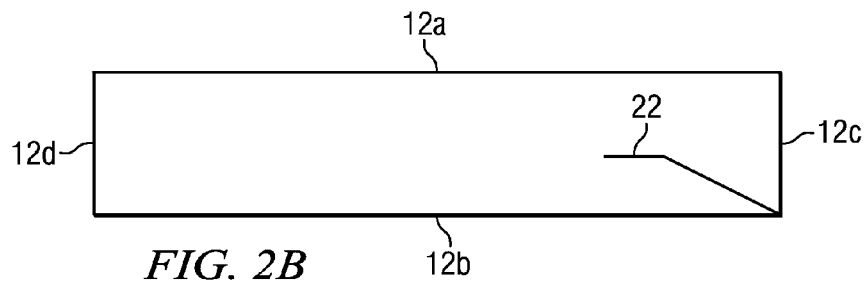
FIG. 2B illustrates an example cross-section of an example arrangement of the example substrate and FPC of FIG. 2A when in the example device of FIG. 1.

FIG. 2B illustrates an example cross-section of an example arrangement of substrate 20 and FPC 22 when in device 10. In FIG. 2B, FPC 22 is "folded" into a central area of device 10. This folding may facilitate device 10 having touch-sensitive areas 12 on all six of its surfaces 12.

Controller 24 may detect and process the presence and location of a touch or proximity of an object on a touch sensor in a touch-sensitive area 12. As described above, a change in capacitance at a capacitive node of the touch sensor may indicate a touch or proximity input at the position of the capacitive node in touch-sensitive area 12. Controller 24 may detect and process the change in capacitance to determine the presence and location of the touch or proximity input. Controller 24 may then communicate information about the touch or proximity input to one or more other components (such one or more central processing units (CPUs) or digital signal processors (DSPs)) of device 10, which may respond to the touch or proximity input by initiating a function of device 10 (or an application running on device 10) associated with it. Although this disclosure describes a particular controller having particular functionality with respect to a particular device and particular touch sensors in particular touch-sensitive areas, this disclosure contemplates any suitable controller having any suitable functionality with respect to any suitable device and any suitable touch sensors in any suitable touch-sensitive areas.

Controller 24 may be one or more integrated circuits (ICs), such as for example general-purpose microprocessors, microcontrollers, programmable logic devices or arrays, application-specific ICs (ASICs). Controller 24 may include a processor unit, a drive unit, a sense unit, and a storage unit. The drive unit may supply drive signals to the drive electrodes of the touch sensors in touch-sensitive areas 12. The sense unit may sense charge at the capacitive nodes of the touch sensors (formed as described above by intersections of drive and sense electrodes or by pairs of drive and sense electrodes capacitively coupled to each other) and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input on a touch sensor in one of touch-sensitive areas 12. The processor unit may also track changes in the position of a touch or proximity input on a touch sensor in one of touch-sensitive areas 12. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular controller having a particular implementation with particular components, this disclosure contemplates any suitable controller having any suitable implementation with any suitable components.

One or more bond pads 26 on FPC 22 may couple controller 24 to corresponding bond pads at the ends of tracks of conductive material extending into or around (e.g. at the edges of) touch-sensitive areas 12. Bond pads 26 may be bonded using an anisotropic conductive film (ACF). The tracks may couple the drive and sense electrodes to bond pads 26, in turn connecting them to controller 24. Particular tracks may provide drive connections coupling controller 24 to drive electrodes of touch sensors in touch-sensitive areas 12, through which the drive unit of controller 24 may supply drive signals to the drive electrodes. Other tracks may provide sense connections coupling controller 24 to sense electrodes of touch sensors in touch-sensitive areas 12, through which the sense unit of controller 24 may sense charge at the capacitive nodes of the touch sensors. The tracks may be made of fine lines of metal or other conductive material. As an example and not by way of limitation, the conductive material may be copper or copper-based and have a width of approximately 100 µm or less. As another example, the conductive material may be silver or silver-based and have a width of approximately 100 µm or less. Although this disclosure describes particular tracks made of particular materials with particular widths, this disclosure contemplates any suitable tracks made of any suitable materials with any suitable widths.

As described above, the drive and sense electrodes of touch sensors in touch-sensitive areas 12 may be made of fine lines of metal or other conductive material. The tracks providing the drive and sense connections to and from the drive and sense electrodes may also be made of fine lines of metal or other conductive material. In particular embodiments, the narrowness of the lines forming the drive and sense electrodes may leave space in touch-sensitive areas 12 for the tracks to extend into or along the edges of touch-sensitive areas 12 without substantially disrupting the patterns of drive electrodes and sense electrodes anywhere in touch-sensitive areas 12. As a result, the tracks may extend into or along the edges of touch-sensitive areas 12 without creating substantial dead zones in or along touch-sensitive areas 12. A dead zone may be an area where there is no deliberate sensing to detect the presence or location of a touch or proximity of an object. In addition or as an alternative, the narrowness of the lines forming the tracks may enable them to extend into or along the edges of touch-sensitive areas 12 without substantially disrupting the patterns of drive electrodes and sense electrodes anywhere in touch-sensitive areas 12.

Particular embodiments provide industrial designs for enabling touch sensing on more than one surface of a mobile device. The touch sensor may be flexible and made from metal-mesh technology with a copper, silver, or other suitable metal mesh. The touch sensor may be designed on a single continuous substrate and may incorporate multiple distinct active areas. In particular embodiments, the substrate may be bonded to a single FPC and driven from one controller. The touch sensor may be wrapped over surfaces of a device that are substantially perpendicular to each other or, if there is no substantial distinction between the surfaces of the device (such as, for example, a pebble-shaped or curved device), an angle of deviation between the surfaces of 45° or greater.

Figure 3:
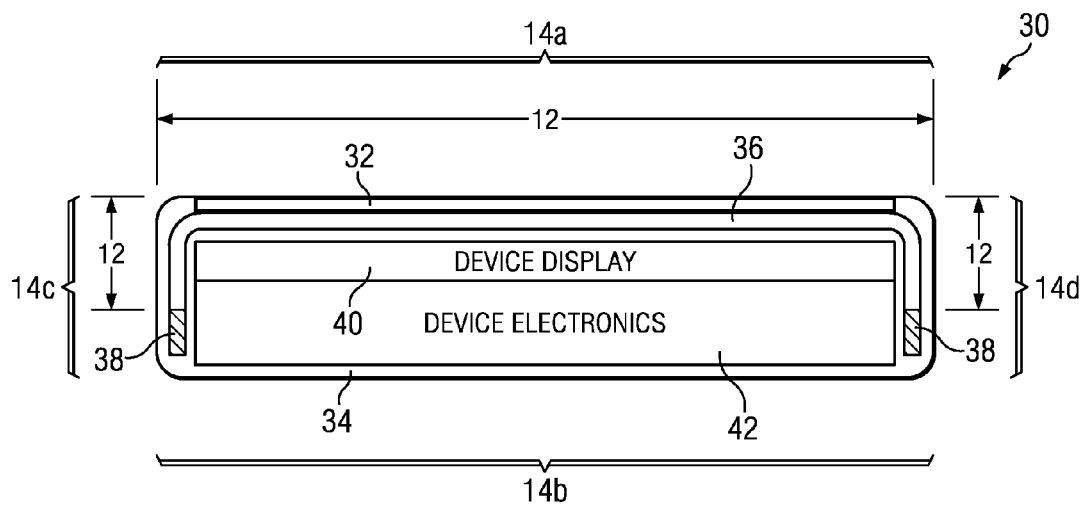
FIG. 3 illustrates a cross section of an example device with multiple touch-sensitive areas on multiple surfaces.

FIG. 3 illustrates a cross section of an example device 30 with multiple touch-sensitive areas 12 on multiple surfaces 14. Device 30 includes a cover panel 32, device housing 34, substrate 36 (with tracking areas 38), device display 40, and device electronics 42. Device 30 has touch-sensitive areas 12 on its left-side surface 14c, its front surface 14a, and its right-side surface 14d. Touch-sensitive area 12 on front surface 14a of device 30 extends out to the left and right edges of front surface 14a of device 30, and touch-sensitive areas 12 on left-side and right-side surfaces 14c and 14d extend from the front edges of left-side and right-side surfaces 14c and 14d toward (but not necessarily all the way to) the back edges of left-side and right-side surfaces 14c and 14d.

Substrate 36 may have drive and sense electrodes disposed on it, and substrate 36 and the conductive material of the drive and sense electrodes may be flexible, enabling them to wrap around the left and right edges of front surface 14a to left-side and right-side surfaces 14c and 14d. For sharper edges (e.g. with radiuses of less than 1 mm), the flexible conductive material of the drive and sense electrodes may be thicker or wider at the sharper edges than at the flat portions of surfaces 14a, 14c, and 14d. In the example of FIG. 3, one substrate 36 with one set of drive and sense electrodes provides a touch sensor for touch-sensitive areas 12 on front surface 14a, left-side surface 14c, and right-side surface 14d of device 30. Substrate 36 may include or have attached to it tracking areas 38, which may include tracks providing drive and sense connections to and from the drive and sense electrodes of touch sensors in touch-sensitive areas 12 of device 30.

In the example of FIG. 3, substrate 36 may have multiple discrete touch-sensitive areas, one or more of which may each have its own controller. As an alternative, in particular embodiments, substrate 36 may have a single continuous touch-sensitive area with a single controller. In both cases, the touch-sensitive area or touch-sensitive areas are on the same substrate and are flexible.

Device display 40 may be a liquid crystal display (LCD), a light-emitting diode (LED) display, an LED-backlight LCD, or other suitable display and may be visible though cover panel 32 and substrate 36 (and the drive and sense electrodes disposed on it). Although this disclosure describes and illustrates a particular device display and particular display types, this disclosure contemplates any suitable device display and any suitable display types. Device electronics 42 may provide the functionality of device 30. As example and not by way of limitation, device electronics 24 may include circuitry or other electronics for wireless communication to or from device 30, running applications on device 30, generating graphical or other user interfaces (UIs) for device display 40 to display to a user, managing power to device 30 from a battery or other power source, taking still pictures, recording video, other suitable functionality, or a suitable combination of these. Although this disclosure describes and illustrates particular device electronics providing particular functionality of a particular device, this disclosure contemplates any suitable device electronics providing any suitable functionality of any suitable device.

Figure 4:
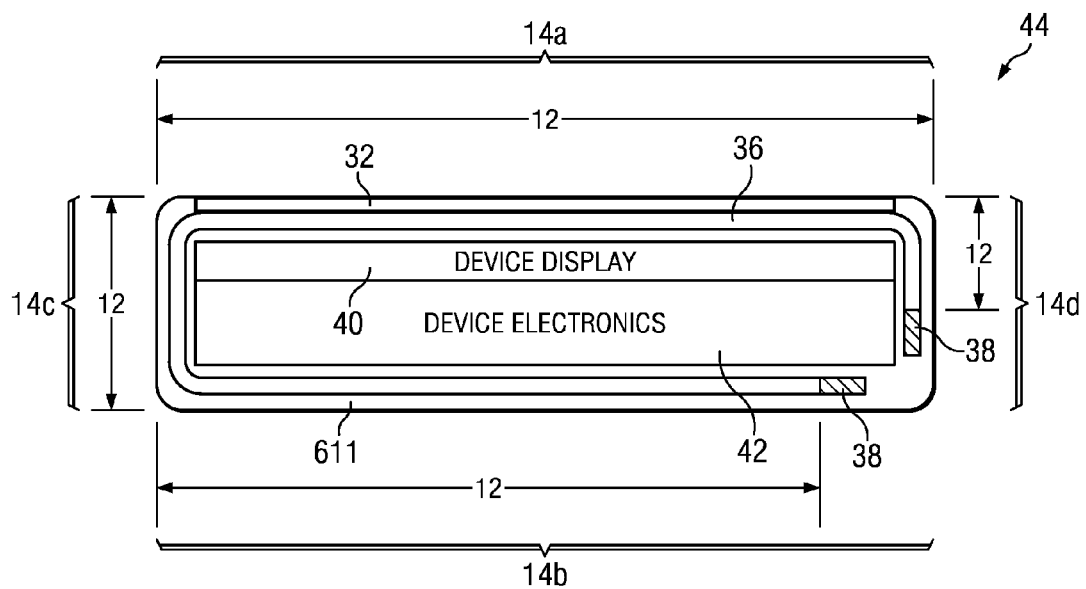
FIG. 4 illustrates a cross section of another example device with multiple touch-sensitive areas on multiple surfaces.

FIG. 4 illustrates a cross section of another example device 44 with multiple touch-sensitive areas 12 on multiple surfaces 14. Device 44 includes a cover panel 32, device housing 34, substrate 36 (with tracking areas 38), device display 40, and device electronics 42. Device 30 has touch-sensitive areas 12 on its front surface 14a, its back surface 14b, its left-side surface 14c, and its right-side surface 14d. Touch-sensitive area 12 on front surface 14a of device 44 extends out to the left and right edges of front surface 14a of device 44; touch-sensitive area 12 on left-side surface 14c extends out to the front and back edges of left-side surface 14c of device 44; touch-sensitive area 12 on back surface 14b extends from the left edge of back surface 14b toward (but not necessarily all the way to) the right edge of back surface 12b of device 44; and touch-sensitive area 12 on right-side surface 14d extends from the front edges of right-side surface 14d toward (but not necessarily all the way to) the back edges of right-side surface 14d.

Substrate 36 may have drive and sense electrodes disposed on it, and substrate 36 and the conductive material of the drive and sense electrodes may be flexible, enabling them to wrap around the left and right edges of front surface 14a to left-side and right-side surfaces 14c and 14d and around the back edge of left-side surface 14c to back surface 14b. For sharper edges (e.g. with radiuses of less than 1 mm), the flexible conductive material of the drive and sense electrodes may be thicker or wider at the sharper edges than at the flat portions of surfaces 14a, 14b, 14c, and 14d. In the example of FIG. 4, one substrate 36 with one set of drive and sense electrodes provides a touch sensor for touch-sensitive areas 12 on front surface 14a, back surface 14b, left-side surface 14c, and right-side surface 14d of device 44. As in the example of FIG. 3, substrate 36 of device 44 of FIG. 4 may include or have attached to it tracking areas 38, which may include tracks providing drive and sense connections to and from the drive and sense electrodes of touch sensors in touch-sensitive areas 12 of device 44.

In the example of FIG. 4, substrate 36 may have multiple discrete touch-sensitive areas, one or more of which may each have its own controller. As an alternative, in particular embodiments, substrate 36 may have a single continuous touch-sensitive areas with a single controller. In both cases, the touch-sensitive area or touch-sensitive areas are on the same substrate and are flexible.

As discussed above with respect to FIGS. 3 and 4, to facilitate wrapping around sharper edges of a device (e.g. edges with radiuses of less than 1 mm), the flexible conductive material of the drive and sense electrodes on the substrate may be thicker or wider at those edges than on the flat portions of the device. In addition or as an alternative, thick or wide extension tracking may be disposed on the substrate at those edges and join touch sensors (which as discussed above may be made from metal-mesh technology with a copper, silver, or other suitable metal mesh) on either side of the bend to facilitate wrapping around sharper edges of the device. In addition or as another alternative, a single-layer configuration (with the drive and sense electrodes disposed in a pattern on one side of the substrate) may be utilized at the sharper edges to facilitate wrapping around sharper edges of a device, instead of a two-layer configuration (with the drive electrodes may be disposed in a pattern on one side of a substrate and the sense electrodes may be disposed in a pattern on another side of the substrate). A two-layer configuration may be used on the flat portions of the device. Although this disclosure describes particular techniques for wrapping around sharper edges of a device, this disclosure contemplates any suitable technique for wrapping around sharper edges of a device.

Herein, reference to a computer-readable storage medium encompasses one or more non-transitory, tangible computer-readable storage media possessing structure. As an example and not by way of limitation, a computer-readable storage medium may include a semiconductor-based or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. An apparatus comprising:
   a substantially flexible substrate configured to bend at an edge between a first surface and a second surface of a device, the edge comprising an angle of deviation between the first and second surfaces of at least approximately 45°;
   a touch sensor disposed on the substantially flexible substrate and configured to bend with the substantially flexible substrate at the edge between the first and second surfaces, the touch sensor comprising drive or sense electrodes, each drive or sense electrode made of a flexible conductive metal mesh, the flexible conductive metal mesh forming each drive or sense electrode configured to bend with the substantially flexible substrate at the edge between the first and second surfaces, wherein a flexible conductive material of the conductive metal mesh of the drive or sense electrodes is thicker or wider at the edge than at the first or second surface, the touch sensor having at least one active area on each of the first and second surfaces; and
   at least two tracking areas coupled to the substantially flexible substrate, the at least two tracking areas arranged on opposing edges of the substantially flexible substrate, each of the at least two tracking areas comprising one or more tracks providing drive or sense connections to or from the drive or sense electrodes of the touch sensor, the one or more tracks disposed on the substantially flexible substrate and configured to bend with the substantially flexible substrate at the edge between the first and second surfaces.

2. The apparatus of claim 1, wherein:
   the touch sensor is continuous with respect to the first and second surfaces and the edge between them; and
   the active areas of the touch sensor on the first and second surfaces are distinct with respect to each other.

3. The apparatus of claim 1, wherein:
   the first surface has at least four edges and the at least one active area of the touch sensor on the first surface extends substantially all the way out to at least one of the edges of the first surface; or
   the second surface has at least four edges and the at least one active area of the touch sensor on the second surface extends substantially all the way out to at least one of the edges of the second surface.

4. The apparatus of claim 1, wherein:
   the device comprises six surfaces;
   the substantially flexible substrate is configured to bend, in addition to the edge between the first and second surfaces of the device, at:
     an edge between the second surface and a third surface of the device;
     an edge between the first surface and a fourth surface of the device;
     an edge between the first surface and a fifth surface of the device; and
     an edge between the third surface and a sixth surface of the device;
   the touch sensor and the flexible conductive metal mesh of its drive or sense electrodes are configured to bend with the substantially flexible substrate, in addition to the edge between the first and second surfaces of the device, at:
     the edge between the second and third surfaces;
     the edge between the first and fourth surfaces;
     the edge between the first and fifth surfaces; and
     the edge between the third and sixth surfaces;
   the touch sensor has at least one active area on each of the third, fourth, fifth, and sixth surfaces, in addition to the first and second surfaces.

5. The apparatus of claim 4, wherein:
   the first surface is on a front of the device;
   the second surface is on a right side of the device;
   the third surface is on a back on the device;
   the fourth surface is on a left side of the device;
   the fifth surface is on a bottom of the device; and
   the sixth surface is on a top of the device.

6. The apparatus of claim 4, wherein:
   the first surface has at least four edges and the at least one active area of the touch sensor on the first surface extends substantially all the way out to at least one of the edges of the first surface;
   the second surface has at least four edges and the at least one active area of the touch sensor on the second surface extends substantially all the way out to at least one of the edges of the second surface;
   the third surface has at least four edges and the at least one active area of the touch sensor on the third surface extends substantially all the way out to at least one of the edges of the third surface;
   the fourth surface has at least four edges and the at least one active area of the touch sensor on the fourth surface extends substantially all the way out to at least one of the edges of the fourth surface;
   the fifth surface has at least four edges and the at least one active area of the touch sensor on the fifth surface extends substantially all the way out to at least one of the edges of the fifth surface; or
   the sixth surface has at least four edges and the at least one active area of the touch sensor on the sixth surface extends substantially all the way out to at least one of the edges of the sixth surface.

7. The apparatus of claim 4, wherein:
   the substantially flexible substrate and touch-sensor bond pads are bonded to a flexible printed circuit (FPC) to make connection with a controller; and
   the FPC is configured for folding away from touch surfaces of the device.

8. The apparatus of claim 1, wherein the edge comprises an angle of deviation between the first and second surfaces of approximately 90°.

9. The apparatus of claim 1, wherein the first or second surface is flat or curved.

10. The apparatus of claim 1, wherein the touch sensor comprises a single-layer configuration or a two-layer configuration.

11. The apparatus of claim 1, wherein the touch sensor is a mutual-capacitance touch sensor or a self-capacitance touch sensor.

12. A device comprising:
    a substantially flexible substrate configured to bend at an edge between a first surface and a second surface of a device, the edge comprising an angle of deviation between the first and second surfaces of at least approximately 45°;
    a touch sensor disposed on the substantially flexible substrate and configured to bend with the substantially flexible substrate at the edge between the first and second surfaces, the touch sensor comprising drive or sense electrodes, each drive or sense electrode made of a flexible conductive metal mesh, the flexible conductive metal mesh forming each drive or sense electrode configured to bend with the substantially flexible substrate at the edge between the first and second surfaces, wherein a flexible conductive material of the conductive metal mesh of the drive or sense electrodes is thicker or wider at the edge than at the first or second surface, the touch sensor having at least one active area on each of the first and second surfaces; at least two tracking areas coupled to the substantially flexible substrate, the at least two tracking areas arranged on opposing edges of the substantially flexible substrate, each of the at least two tracking areas comprising one or more tracks providing drive or sense connections to or from the drive or sense electrodes of the touch sensor, the one or more tracks disposed on the substantially flexible substrate and configured to bend with the substantially flexible substrate at the edge between the first and second surfaces; and one or more computer-readable non-transitory storage media embodying logic that is configured when executed to control the touch sensor.

13. The device of claim 12, wherein:
the touch sensor is continuous with respect to the first and second surfaces and the edge between them; and
the active areas of the touch sensor on the first and second surfaces are distinct with respect to each other.

14. The device of claim 12, wherein:
the first surface has at least four edges and the at least one active area of the touch sensor on the first surface extends substantially all the way out to at least one of the edges of the first surface; or
the second surface has at least for edges and the at least one active area of the touch sensor on the second surface extends substantially all the way out to at least one of the edges of the second surface.

15. The device of claim 12, wherein:
the device comprises six surfaces;
the substantially flexible substrate is configured to bend, in addition to the edge between the first and second surfaces of the device, at:
    an edge between the second surface and a third surface of the device;
    an edge between the first surface and a fourth surface of the device;
    an edge between the first surface and a fifth surface of the device; and
    an edge between the third surface and a sixth surface of the device;
the touch sensor and the flexible conductive metal mesh of its drive or sense electrodes are configured to bend with the substantially flexible substrate, in addition to the edge between the first and second surfaces of the device, at:
    the edge between the second and third surfaces;
    the edge between the first and fourth surfaces;
    the edge between the first and fifth surfaces; and
    the edge between the third and sixth surfaces;
the touch sensor has at least one active area on each of the third, fourth, fifth, and sixth surfaces, in addition to the first and second surfaces.

16. The device of claim 15, wherein:
the first surface is on a front of the device;
the second surface is on a right side of the device;
the third surface is on a back on the device;
the fourth surface is on a left side of the device;
the fifth surface is on a bottom of the device; and
the sixth surface is on a top of the device.

17. The device of claim 15, wherein:
the first surface has at least four edges and the at least one active area of the touch sensor on the first surface extends substantially all the way out to at least one of the edges of the first surface;
the second surface has at least four edges and the at least one active area of the touch sensor on the second surface extends substantially all the way out to at least one of the edges of the second surface;
the third surface has at least four edges and the at least one active area of the touch sensor on the third surface extends substantially all the way out to at least one of the edges of the third surface;
the fourth surface has at least four edges and the at least one active area of the touch sensor on the fourth surface extends substantially all the way out to at least one of the edges of the fourth surface;
the fifth surface has at least four edges and the at least one active area of the touch sensor on the fifth surface extends substantially all the way out to at least one of the edges of the fifth surface; or
the sixth surface has at least four edges and the at least one active area of the touch sensor on the sixth surface extends substantially all the way out to at least one of the edges of the sixth surface.

18. The device of claim 15, wherein:
the substantially flexible substrate and touch-sensor bond pads are bonded to a flexible printed circuit (FPC) to make connection with the media embodying logic configured to control the touch sensor;
the FPC is configured for folding away from touch surfaces of the device.

19. The device of claim 12, wherein the edge comprises an angle of deviation between the first and second surfaces of approximately 90°.

20. The device of claim 12, wherein the first or second surface is flat or curved.

21. The device of claim 12, wherein the touch sensor comprises a single-layer configuration or a two-layer configuration.

22. The device of claim 12, wherein the touch sensor is a mutual-capacitance touch sensor or a self-capacitance touch sensor.

23. The apparatus of claim 1, wherein the flexible conductive metal mesh comprises fine lines of metal at least a portion of which have a thickness of approximately 5 μm or less and a width of approximately 10 μm or less.

24. The device of claim 12, wherein the flexible conductive metal mesh comprises fine lines of metal at least a portion of which have a thickness of approximately 5 μm or less and a width of approximately 10 μm or less.

25. The apparatus of claim 1, further comprising a cover panel disposed above the substantially flexible substrate, the cover panel having a thickness of approximately 1 mm.

26. The device of claim 12, further comprising a cover panel disposed above the substantially flexible substrate, the cover panel having a thickness of approximately 1 mm.

* * * * *